United States Patent
Kretschmer et al.

[11] Patent Number: 5,454,759
[45] Date of Patent: Oct. 3, 1995

[54] SEALING ASSEMBLY FOR A UNIVERSAL JOINT

[75] Inventors: Horst Kretschmer, Cologne; Hans-Jürgen Langen, Frechen; Clemens Nienhaus, Lohmar, all of Germany

[73] Assignee: GKN Walterscheid GmbH, Lohmar, Germany

[21] Appl. No.: 134,749

[22] Filed: Oct. 12, 1993

[30] Foreign Application Priority Data

Oct. 14, 1992 [DE] Germany .......................... 42 34 614.2

[51] Int. Cl.⁶ .................................................. F16D 3/41
[52] U.S. Cl. ........................................ 464/131; 277/152
[58] Field of Search ............................ 464/131, 128, 464/11, 14; 277/152, 134, 68, 207 R, 213

[56] References Cited

U.S. PATENT DOCUMENTS

| | | |
|---|---|---|
| 2,996,901 | 8/1961 | Kleinschmidt . |
| 4,154,490 | 5/1979 | Kohler et al. ............... 464/131 |
| 4,179,905 | 12/1979 | Schultenkamper ............ 464/131 |
| 4,440,401 | 4/1984 | Olschewski et al. .......... 464/131 |
| 4,568,092 | 2/1986 | Hayashida et al. ........... 277/134 |
| 4,690,414 | 9/1987 | Haaland .................... 277/152 |
| 4,943,262 | 7/1990 | Schultze ................... 464/131 |
| 5,040,804 | 8/1991 | Back ...................... 277/152 |

FOREIGN PATENT DOCUMENTS

| | | |
|---|---|---|
| 2708137 | 6/1978 | Germany . |
| 2718503 | 11/1978 | Germany . |
| 3639315 | 4/1988 | Germany . |
| 995934 | 6/1965 | United Kingdom . |

Primary Examiner—Daniel P. Stodola
Assistant Examiner—Eileen A. Dunn
Attorney, Agent, or Firm—Harness, Dickey & Pierce

[57] ABSTRACT

A sealing assembly for the arms (6) of a cross member (5) of a universal joint has a seal (16) with a fixing portion (17) including a bore (18) which rests on the arm (6). In the region of its bore (18), the fixing portion (17) includes axially extending grooves (19) which open towards the bearing interior and the second end face (22) of the fixing portion (17), respectively. Towards the outside, the grooves are closed by a sealing lip (25). The sealing lips (30, 31), which have a sealing effect relative to the sealing face (32) of the bearing bush (7), are arranged at annular portions (28, 29). The sealing lip (30) closes under the pressure of lubrication. During the lubricating process, the lubricant is able to escape outwardly through the grooves (19) and the gap between the lifted sealing lip (25) and the annular shoulder (24). By separating the sealing function between the cross member and bearing bush when the two parts move relative to one another and the lubricating function via the channels, an improved sealing effect is achieved. When the internal pressure rises, the contact pressure of the sealing lip is adjusted by making use of the self-closing effect. The opening function of the sealing lip closing the lubricating grooves may accordingly be adjusted to the lubrication pressure which is usually higher.

12 Claims, 2 Drawing Sheets

SEALING ASSEMBLY FOR A UNIVERSAL JOINT

BACKGROUND OF THE INVENTION

The invention relates to a sealing assembly with a seal for sealing each arm of a cross member associated with a universal joint relative to the bearing bush which supports the arm and is closed at one end. The seal includes a fixing portion with a seat face, an annular web which projects from the circumference of the fixing portion, and annular portions which extend in the direction opposite thereto and have sealing lips at their free ends.

A known sealing assembly is shown in GB-PS 995934, issued Jun. 23, 1965. In this sealing assembly, the seal is held so as to be stationary relative to the bearing bush and, via two sealing lips, rests on the sealing contour of the arm of the cross member. The design of the seal is such that subsequent lubrication is not possible. The bearing region is provided with one single grease reservoir. Subsequent lubrication is not possible because the sealing lips close if a lubricant is introduced under pressure. As a result of the pressure, there is a risk of the seal being ejected from the seat in the bearing bush.

In the case of universal joints or driveshafts provided with universal joints and used for driving agricultural machinery, subsequent lubrication is necessary because of the seasonal use of the machinery.

SUMMARY OF THE INVENTION

It is an object of the invention to provide a sealing assembly with a seal which permits subsequent lubrication while ensuring an improved sealing effect under normal operating conditions.

In accordance with the invention, the assembly fixing portion includes a bore constituting the seat face, via which it rests on the arm. The fixing portion includes a first seat face directed towards the closed end of the bearing bush and a second seat face pointing towards the open end of the bearing bush. At least one channel is provided which extends along the bore and which opens towards the end faces of the fixing portion. The fixing portion includes sealing means which close the channel relative to the free environment and which open under lubrication pressure.

The advantage of this design is that under normal operating conditions where there occurs a relative movement between the arm and bearing bush, a good sealing effect is ensured. At the same time, the seal permits the bearing region to be lubricated. By separating the functions, it is possible to eliminate the disadvantages usually existing in the case of seals permitting lubrication and involving the sealing lips being damaged by the pressed-out grease and any impurities contained therein. A further advantage provides, if the internal pressure rises, for example as a result of an increase in temperature, the sealing lip arranged towards the first end face of the fixing portion with an ever increasing sealing effect.

In this way, it is ensured that the lubricant which becomes more liquid with an increasing temperature is effectively prevented from emerging. The closing pressure of the sealing means for the lubricating channels may be such that they do not open unless the lubrication pressure is high. For sealing the region between the arm and bearing bush under normal operating conditions, the pretension for the seals has to be considerably lower than required for the pressure levels normally occurring during lubrication. This is necessary for keeping any wear within acceptable limits at the friction parts of the seal.

Because of the way in which the sealing lips for sealing the bearing bush are arranged, it is possible to achieve a seesaw-effect which is advantageously influenced by the relatively thin annular web and the more voluminous connections in the region of the annular portions. The first sealing lip arranged towards the first end face effectively prevents any grease from leaving the bearing bush, whereas the second sealing lip arranged towards the open end of the bearing bush prevents any dirt from penetrating. Additionally, the seesaw-effect may be influenced by the diameter of the bore of the fixing portion, which diameter may be such that during assembly, the fixing portion widens.

In one embodiment of the invention, the sealing means is provided in the form of an annular sealing lip axially projecting beyond the second end face of the fixing portion, with the sealing lip resting against the annular shoulder of the arm. In this way, it is possible to achieve an annular space located between the second end face of the fixing portion and the annular shoulder on the one hand and the sealing lip on the other hand. This space may be used as a compensating space for receiving the lubricant contained in the bearing and pulsating as a result of the intermittent movement. In this way it is ensured that the bearing space is always completely filled with lubricant. The annular space also furthers the exchange of lubricant during the changes in volume caused by pumping or heating up the lubricant reservoir causing the seal to move relative to the bearing bush is advantageous since it has a wear reducing effect. The wear reducing effect is due to the bearing bush, which is usually produced by a non-chip forming operation, having a much smoother surface than the cross member which is usually subjected to precision-turning. In this way, friction and thus wear is reduced at the sealing lips.

In a preferred embodiment, a plurality of channels are provided designed in the form of a plurality of grooves distributed along the inner circumference of the bore of the fixing portion. The grooves extend along the bore between the two end faces of the fixing portion. The length of the channels formed by grooves makes it possible for the lubricant to expand, due to heat, without any outside dirt penetrating the lubricant.

To prevent the sealing lip for sealing the lubricating channels from being overloaded, the fixing portion is provided with a radially inwardly directed collar which, in the assembled condition, is axially supported against a shoulder of the arm, thereby limiting the sliding-on movement. The collar is associated with the first end face of the fixing portion. In spite of existing tolerances, the pretension of the sealing lip is essentially kept constant.

In a further embodiment, the annular portions include the sealing lips with a sealing function relative to the sealing face feature different radial thicknesses. The sealing face is designed as a conical face which widens towards the open end of the bearing bush.

Preferably, the bore of the fixing portion includes a conically widened region towards the second end face. In this way, it is ensured that the seal can be introduced into the conical bore of the bearing bush without tilting. It is only when the second lip arranged towards the open end is introduced into the bore that the inner lip is pressed on via the annular web to form a seesaw.

To facilitate the process of sliding the fixing portion onto the associated seat of the arm, it is proposed, according to a further embodiment, that the bore of the fixing portion should include a conically widened region towards the second end face.

The design in accordance with the invention permits the seal to be produced in the form of a plastic injection molded part. The seal preferably consists of polyamide 66, but it may also be made of rubber.

To complement the invention, the first end face of the fixing portion may serve as a supporting face for axially supporting a stop plate. In this way it is possible to hold the seal in a preassembled condition in the bearing bush for the purpose of mounting the bearing bush on the cross member. The reaction force required for sliding on the bearing bush together with the seal is transferred via the end stop plate and the bearing needles to the base of the bearing bush. To ensure that, in the course of dismantling, the seal remains in the bearing bush, it is proposed that the contact between the stop plate and the sealing face of the bearing bush is of the friction locking type.

To improve strength properties, the fixing portion of the seal may be reinforced by using a steel insert or a steel bush for example.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention is diagrammatically illustrated in the drawings wherein.

DETAILED DESCRIPTION OF THE PREFERRED EMBODIMENTS

Figure 1:
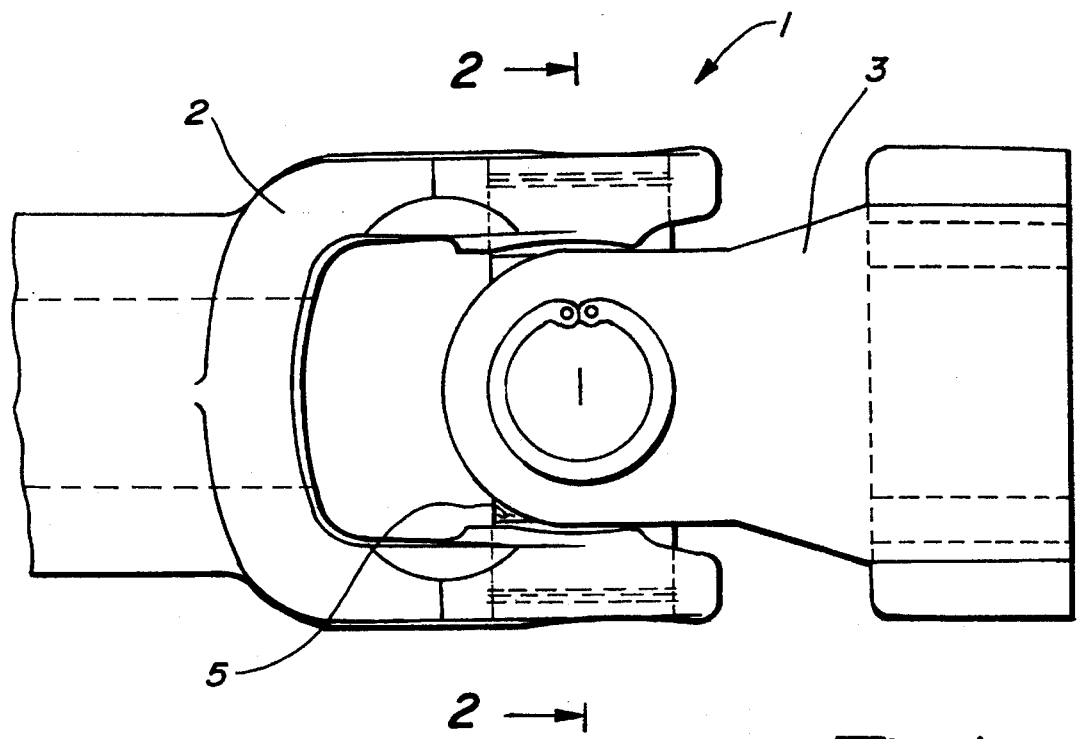
FIG. 1 is a side plan view of a universal joint in the extended position.
Figure 2:
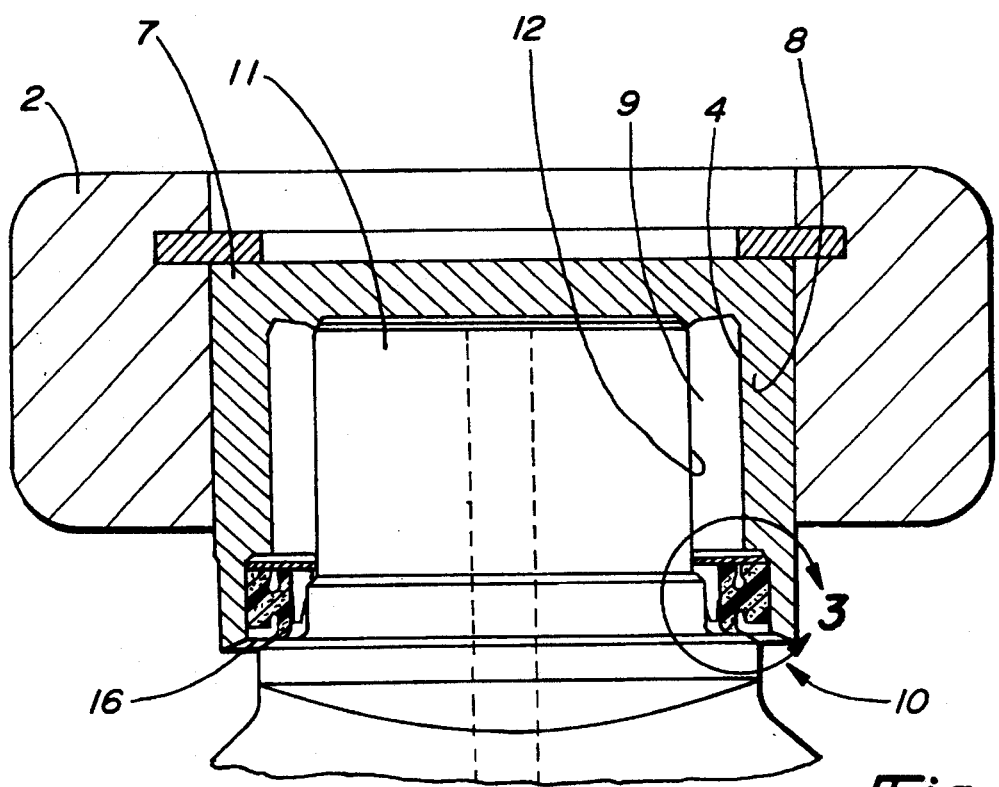
FIG. 2 is a section view of FIG. 1 along line 2—2 thereof.

The universal joint 1 shown in FIGS. 1 and 2 includes the two joint yokes 2, 3 which are connected to one another so as to be articulatable by a cross member 5. The cross member 5 has four arms 6 arranged at right angles relative to one another and preferably in one plane. As can be seen particularly clearly in FIG. 2, the yoke arms of the two joint yokes 2, 3 are provided with bearing bores 4.

The cross member 5 is supported in the bearing bores 4 via bearing bushes 7. The bearing bushes 7 are held in the bearing bores 4 by securing rings to prevent them from radially escaping. The arms 6 of the cross member 5 are received in the bearing bushes 7. Between the inner wall 8 and the bearing portion 11 of the associated arm 6, a ring of circumferentially distributed bearing needles 9 are arranged so that in the case of a relative movement, there exists a rolling contact type of support. On the radial outside, the bearing bush 7 is closed by a base. The open end 10 of the bearing bush 7 is positioned towards the center of the cross member 5. Between the outer face 12 of the associated bearing arm 6 and the inner face 8 of the bearing bush 7 there exists an annular gap which is sealed by a seal 16.

Figure 3:
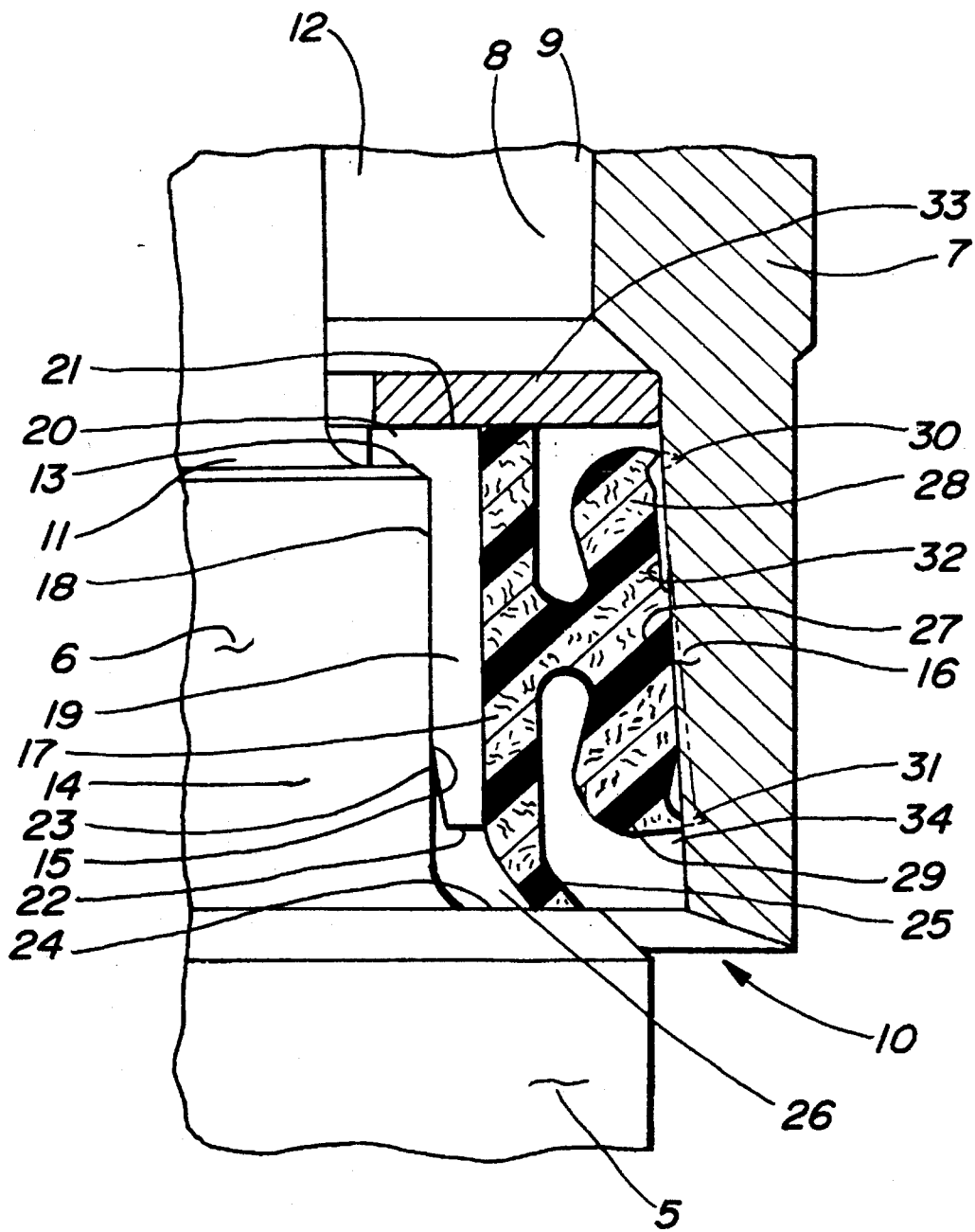
FIG. 3 in an enlarged cross section view of FIG. 2 within the detail Z.

The design of the seal 16 is particularly obvious from FIG. 3. The seal 16 has an annular shape, with FIGS. 2 and 3 only showing the cross-section and the way in which it is associated with the bearing bush 7 and the arm 6. The bearing needles 9 roll on the outer face 12 of the bearing portion 11, with the arm 6 being enlarged stepwise towards the center of the outer face 12. Via a shoulder 13, the arm 6 passes from the bearing portion 11 into the seal seat portion 14. The outer face of the seal seat portion 14 has been given the reference number 15. The seal 16 is slid onto the seal seat portion 14.

The seal 16 includes a fixing portion 17 which is substantially cylindrical and includes a bore 18, via which the fixing portion 17 is firmly positioned on the seal seat portion 14 by means of a press fit so that the seal 16 cannot carry out any relative movements relative to the arm 6. In the bearing interior, towards the bearing needles 9, the fixing portion 17 includes a first end face 21. Its second end face 22 points towards the open end 10 of the fixing portion 17. Towards the second end face 22, the cross-section of the bore 18 is conically widened. The conically widened region has the reference number 23 and facilitates the process of sliding on the fixing portion 17. The sliding-on movement is limited by the inwardly directed collar 20 in the region of the first end face 21 of the fixing portion. In the assembled condition, the collar 20 abuts the shoulder 13 of the arm 6. An annular sealing lip 25 resting against an annular shoulder 24 of the arm 6 projects from the second end face 22.

Between the first end face 21 and the second end face 22, the bore 18 is provided with axially extending grooves 19 which are circumferentially distributed relative thereto and which form channels for the flow of lubricant when lubricating the bearing. The annular sealing lip 25 has a sealing function and is designed in such a way that it opens under the pressure of the lubricant when lubrication takes place, it lifts off the annular shoulder 24. The annular space 26 formed between the sealing lip 25, the second end face 22 and the outer face of the seal seat portion 15 serves as a space for storing and exchanging the lubricant which pulsates as a result of changes in temperature or due to the relative movement between the arm 6 and the bearing bush 7.

The outer face of the fixing portion 17 is provided with an annular web 27 from where there extend the two annular portions 28, 29. At their ends, the annular portions 28, 29 carry sealing lips 30, 31 which have a sealing function relative to the conical sealing face 32 of the bearing bush 7. In the untensioned condition, the condition of the annular portions 28, 29 illustrated in dash-dotted lines, the points of the sealing lips 30, 31 are also positioned on the outer face of the imaginary cone. In this way it is ensured that the first sealing lip 30 arranged towards the bearing needles 9 cannot tilt or be damaged during assembly due to the resulting axial relative movements. The contact of the lip 30 is effected via the annular web 27 as a result of the seesaw movement and is initiated by the lip 31 with the greater diameter entering the conical bore 34 of the bearing bush 7. Towards the bearing needles 9, a stop plate 33 is positioned in front of the collar 20 of the fixing portion 17, with the outer face of the stop plate 33, under pretension, resting against the conical sealing face 32 of the bearing bush 7. The stop plate 33 ensures that, during the dismantling operation, the bearing needles 9 remain in the bearing bush 7. The cone angle of the sealing face 32 is small so that the necessary friction is ensured. To achieve the necessary pretension, the stop plate 33 is preferably slotted, with the size of the slot being small enough to ensure that the rolling movement of the bearing needles 9 is not affected.

To permit lubrication, the cross members of universal joints are usually provided with lubricating bores which axially extend through the arms and intersect one another. At the point of intersection, in the center of the cross member, there is arranged a lubricating nipple via which lubrication takes place. The lubricant is guided via the bores towards the end faces of the arms 6. The lubricant is then deflected and flows backwards through the gap between the bearing needles in the direction of the seal 16. In the process, it reaches the space existing between the annular portion 28, including the first sealing lip 30, and the opposed part of the fixing portion 17, with the contact pressure of the first sealing lip 30 increasing under the pressure of the lubricant. After reaching the lubrication pressure necessary to open the sealing lip 25 to lift the sealing lip 25 off the annular shoulder 24, the excess lubricant reaches the outside via the circumferentially distributed grooves 19.

While the above detailed description describes the preferred embodiment of the present invention, the invention is susceptible to modification, variation, and alteration without deviating from the scope and fair meaning of the subjoined claims.

We claim:

1. A sealing assembly for sealing each arm of a cross member associated with a universal joint relative to a bearing bush which supports the arm and is closed at one end, the sealing assembly comprising:

a seal including an annular fixing portion with a seat face, an annular web projecting from the circumference of said fixing portion, and annular portions extending from the web in opposite directions thereto and said annular portions having free ends which act as sealing lips, which are movable with respect to said web and seal with the bearing bush;

said fixing portion including a bore defining the seat face resting on the arm, a first end face directed towards the closed end of the bearing bush and a second end face pointing towards an open end of the bearing bush, at least one channel in said fixing portion which extends along the bore and which opens towards the end faces of the fixing portion, and sealing means for closing the channel relative to the free environment and said sealing means opening under the pressure of lubrication, said sealing means being coupled with said fixing portion.

2. A sealing assembly according to claim 1, wherein said sealing means includes an annular sealing lip axially projecting beyond the second end face of the fixing portion and said sealing lip resting against an annular shoulder of the arm.

3. A sealing assembly according to claim 1, wherein the at least one channel comprise a plurality of channels are distributed along the inner circumference of the bore of the fixing portion and extending axially along the bore.

4. A sealing assembly according to claim 1, wherein said fixing portion includes a radially inwardly directed collar via which it is axially supported against a shoulder of the arm.

5. A sealing assembly according to claim 1, wherein said annular portions having different radial thicknesses and said sealing lips sealing a sealing face of said bearing bush, said sealing face is designed as a conical face which widens towards the open end of the bearing bush.

6. A sealing assembly according to claim 1, wherein towards the second end face, the bore of the fixing portion comprises a conically widened region.

7. A sealing assembly according to claim 1, wherein said sealing lip arranged towards the open end of the bearing bush, in an untensioned condition, includes a larger diameter than the sealing lip arranged towards the closed end of the bearing bush.

8. A sealing assembly according to claim 1, wherein seal is designed as a plastic injection molded part.

9. A sealing assembly according to claim 8, wherein the seal is manufactured from polyamide 66.

10. A sealing assembly according to claim 1, wherein the first end face of the fixing portion serves as a supporting face for axially supporting a stop plate.

11. A sealing assembly according to claim 10, wherein friction contact locks the stop plate and a sealing face of the bearing bush.

12. A sealing assembly according to claim 1, wherein the fixing portion is reinforced.

* * * * *